United States Patent [19]

Brown

[11] 4,058,096
[45] Nov. 15, 1977

[54] APPARATUS AND METHOD FOR INCREASING THE HORSEPOWER OF AN INTERNAL COMBUSTION ENGINE

[76] Inventor: Stephen Edward Brown, 501 South Matlack St., West Chester, Pa. 19380

[21] Appl. No.: 550,770

[22] Filed: Feb. 18, 1975

[51] Int. Cl.² .................... F02M 31/00; F25D 3/12
[52] U.S. Cl. .................... 123/119 CG; 55/267; 62/384; 123/119 CF; 123/122 R; 123/198 E
[58] Field of Search ............ 123/41.01, 41.31, 119 C, 123/119 CD, 119 CF, 119 CG, 195 C, 198 E, 122 R, 122 D; 60/599; 261/127; 55/267; 62/239, 245, 384

[56] References Cited

U.S. PATENT DOCUMENTS

| 2,150,295 | 3/1939 | Somers | 123/119 CG |
|---|---|---|---|
| 2,184,918 | 12/1939 | Kowitt | 123/119 CG |
| 2,241,420 | 5/1941 | Pinkel | 123/119 CD |
| 2,267,706 | 12/1941 | Baik et al. | 123/119 CG |
| 2,366,365 | 1/1945 | Sorensen | 123/119 CD |
| 2,453,295 | 11/1948 | Battley et al. | 62/245 |
| 2,983,265 | 5/1961 | Robbins et al. | 123/119 C |
| 3,441,011 | 4/1969 | Karl | 123/41.31 |
| 3,481,119 | 12/1969 | McKinlay | 123/119 CG |
| 3,529,435 | 9/1970 | Becker | 62/384 |
| 3,565,201 | 2/1971 | Petsinger | 123/122 E |

FOREIGN PATENT DOCUMENTS 2,013,049  9/1971  Germany ................. 55/267

*Primary Examiner*—Ronald H. Lazarus
*Assistant Examiner*—David D. Reynolds
*Attorney, Agent, or Firm*—Edward J. Sites

[57] ABSTRACT

An apparatus and method is provided for increasing the effective horsepower of an internal combustion engine. The apparatus consists of a cooling chamber mounted so as to be in communication with the air inlet portion of the carburetor of the engine. In the method of this invention, the ambient air prior to introduction into the carburetor is substantially cooled to quantitatively increase the weight of oxygen in the volume of air introduced into the carburetor. This makes it possible to feed an additional amount of fuel to the engine while maintaining the optimum air-fuel ratio, thereby effectively increasing the horsepower obtainable from the engine.

5 Claims, 5 Drawing Figures

APPARATUS AND METHOD FOR INCREASING THE HORSEPOWER OF AN INTERNAL COMBUSTION ENGINE

BRIEF SUMMARY OF THE INVENTION

This invention relates to an apparatus and a method for increasing the effective horsepower obtained from an internal combustion engine. More particularly, this invention is a cooling device which increases and to a large extent standardizes the weight of oxygen in a given volume of air introduced into the carburetor under a wide variety of temperature and barometric conditions.

DETAILED DESCRIPTION OF THE INVENTION

In accordance with the teachings of this invention an air inlet means is provided for internal combustion which includes a cooling element sufficient to substantially reduce the temperature of the air and thereby increase its density and oxygen content.

Figure 1:
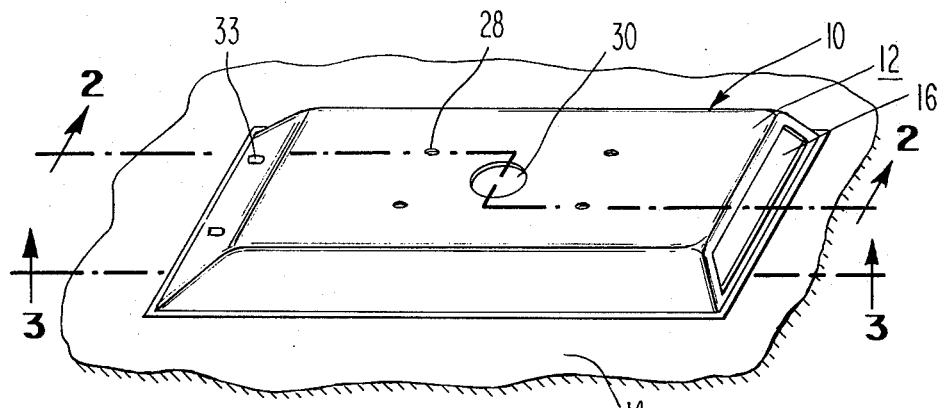
FIG. 1 is an isometric top plan illustration of the apparatus of this invention shown in combination with the hood portion of an automobile.
Figure 2:
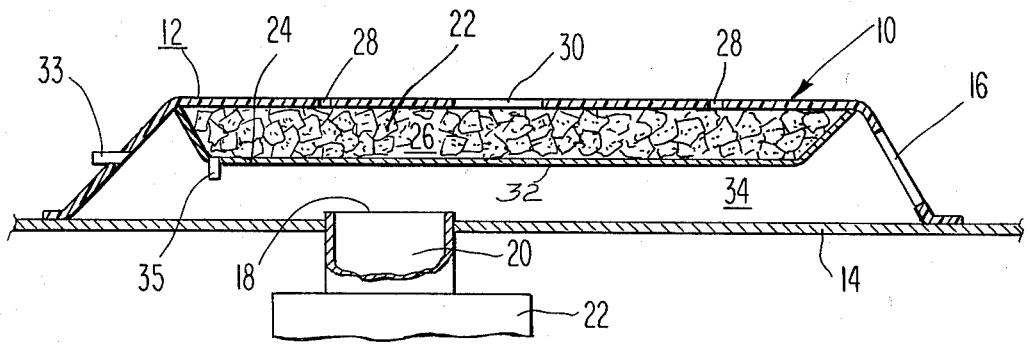
FIG. 2 is a cross-section illustration taken as indicated by the lines and arrows 2—2 which schematically illustrate the air flow through the apparatus of this invention to the carburetor of the engine.
Figure 3:
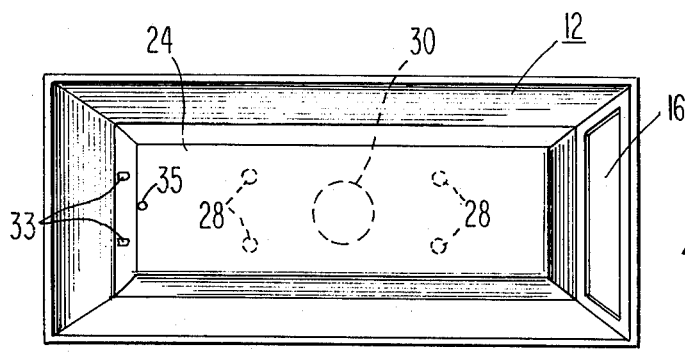
FIG. 3 is the bottom view taken looking upwardly from the hood portion as shown by line and arrow 3—3 of FIG. 1 of the apparatus of this invention.

In explaining the apparatus of this invention 10 specific reference will be made to the type of device commonly referred to as an air scoop 12 as shown in FIGS. 1 and 2. The air scoop 12 is mounted onto the hood 14 of an automobile with hood 14 forming in effect the base portion of the scoop 12. An inlet aperture 16 is provided in the front of the scoop 12 through which air is drawn into and through the scoop 12 to an outlet aperture 18 and into the air horn 20 of the carburetor 22 of the engine. When the engine is initially started and the automobile is standing still, air is sucked through the inlet aperture 16 in the scoop 12 by the carburetor 22. However, once the automobile proceeds to accelerate, the ambient air is forced through the inlet aperture 16 in the scoop and out the outlet aperture 18 into the carburetor 22 by the forward motion of the automobile. This increases the supply of air to the engine. It is well known that the use of a conventional air scoop will increase the effective horsepower of an internal combustion engine up to about seven percent.

The supply of air to an internal combustion engine, more precisely the amount by weight of oxygen to the amount by weight of fuel used, is highly critical in order to obtain the maximum performance. The ratio of the weight of air to the weight of fuel is generally attempted to be held in the area of 12:1 to 15:1.

The standard metering device for introduction of the fuel and air into an engine is a carburetor. The carburetor is, however, a basically volumetric device, that is, it provides pre-determined given volumes of fuel and air to the engine.

The volume of a given weight of fuel and the volume of a given weight of air is highly temperature dependent, especially that of the air. An increase or decrease of only a few degrees in temperature can substantially change the volume of a given weight of air so that the weight ratio of the air-fuel mixture which is fed to the carburetor is completely changed. Changes in the barometric pressure likewise have an effect on the weight of oxygen present in a given volume of air. The above problem has been well recognized by those well skilled in the art, and attempts to correct this have, however, been unsuccessful.

In general, it is highly desirable to increase the amount of an air-fuel mixture having the proper ratio to improve performance. Various techniques have been utilized to somewhat standardize the weight of fuel fed to the engine. These methods include the use of multiple fuel pumps which compensate for changes in temperature and/or barometric pressure. In addition, it is also well known in the art to include cooling means through which the fuel is passed under constant pressure so as to chill it and standardize the weight per volume of fuel fed to the engine.

The one variable which has remained extremely difficult to control and which is highly important with regard to the performance of the engine is the quantitative amount of oxygen introduced into the engine for purposes of combustion with the fuel. Under normal conditions in automobile racing it is not uncommon to encounter wide variations in temperatures and barometric pressure. For example, when racing during a typical day, the air during the daylight hours is generally at a higher temperature and a lower density when it is introduced into the engine. However, in the evenings when the air is cooler and has a higher density, there is a greater amount of oxygen in a given volume of air. A further problem which is encountered which causes changes in the oxygen content is variations in the barometric pressure. As the barometric pressure increases, the air becomes more dense and the oxygen content per volume of air is increased and vice versa.

In order to compensate for the variations in the oxygen content in a given volume of air various devices have heretofore been suggested. The most widely used device is a supercharger. The supercharger is basically an air pump which forces air into the carburetor. The supercharger setting can be varied according to the temperature and barometric pressure to obtain an increase or decrease in the volume of air and consequently oxygen fed to the engine. The supercharger has certain inherent defects. One such defect is that in order to operate the supercharger it is necessary to either operate it directly off the engine by means of a fan belt which takes the horsepower from the engine or working it off the back pressure of the engine which can only be effectively utilized at high engine RPM.

Because of the constant changes in both the atmospheric temperature and the barometric pressure, setting of the engine air-fuel ratio to obtain the optimum performance is at best a guessing game if not an art. Typically when setting a high performance engine, the car is run on the track for a given measured distance, for example one quarter mile. A spark plug is then removed from the engine and examined. If the spark plug is wet, this indicates that the air-fuel mixture is too rich in fuel, and adjustments are made either reducing the amount of fuel or if a supercharger is available increasing the amount of air to the engine. The engine is then again run and the setting changed empirically to obtain what is considered the optimum running condition of the engine under the current condition. This is achieved when the plug, after being removed, is just dry and slightly tan in color, indicating substantially complete combustion of the fuel-air mixture.

In accordance with the teachings of this invention, means for substantially cooling the air fed to the engine is mounted within air inlet means. The apparatus of this invention 10 shown in FIG. 1 substantially cools the air and increases its oxygen content prior to the introduction into the carburetor 22. As shown in FIG. 2, the apparatus of this invention is comprised of an air scoop 12, a flat container 24 mounted to the underside of the air scoop 12, and a base which as shown in the hood 14.

The container 24 is made of a highly temperature conductive material such as aluminum, galvanized iron, or stainless steel. The temperature conductivity of the container 24 can be substantially increased by increasing the exposed cooling area of the container. This can advantageously be done by forming the container with cooling fins (not shown) which extent into the air passage 34. The use of a finned container is also of advantage where it is desired to limit the volume of the container without reducing the effective cooling rate. The container 24 is secured and sealed air tight to the underside of the air scoop 12 to form a chamber 26. A loading port 30 is provided in the air scoop 12 to permit the filling of the scoop with a super-cooled material 22 such as dry ice. Dry ice, when used as the coolant, reduces the temperature of the exposed surface 32 of the container 24 from ambient air temperature which typically is 80° to 90° F to a temperature of approximately minus 80° F. The cooling is the result of the conversion of the dry ice to carbon dioxide gas. Aperture 28 is provided in the air scoop 12 to permit release of gas pressure from within the chamber 26. The carbon dioxide gas is released through the aperture 28 heretofore mentioned to the atmosphere. This is an important feature when using dry ice in that if carbon dioxide gas was allowed to mix with the air being introduced into the carburetor, carbon dioxide being an inert ingredient in the combustion process, it would act as a diluent reducing the effective weight of oxygen available.

When the engine is started, the air is sucked through the inlet aperture 16 in the air scoop 12 and through the air passage 34 in the scoop 12. As the air passes the exposed surface 32 of the chamber 26 the air is substantially cooled and the oxygen content in a given volume of air is increased. It should be further noted that if the air is extremely moist the excessive water vapor in the air condenses as snow on the exposed surface 32 reducing the possibility of icing or excessive moisture entering the carburetor.

In the preferred embodiment of this invention vents 33 are provided at the rear portion of the air scoop 12. These vents 33 permit the escape of a limited amount of the air from the scoop. In practice the heavy air fraction and especially the water vapor in the air due to gravitational effect is selectively sucked out the vents, further limiting the possibility of icing in the carburetor. The vents 33 are most preferably adjustable so the opening can be changed depending on the moisture content of the ambient air.

The apparatus of this invention likewise preferably includes a valve 35 which is attached to the flat container 24 and is in communication with the chamber 26. This valve 35 is used to facilitate flushing out the chamber 26 as needed and also to remove liquid which may accumulate in the chamber 26 if a coolant which melts is utilized. It is also used to remove additives used to improve the cooling rate when dry ice is used as the coolant.

When the automobile starts to accelerate rapidly as in a race, the ambient air is forced with greater and greater pressure into the scoop and into more intimate contact with the exposed surface 32 of the chamber 26. The air temperature being substantially reduced improves the performance of the engine. Furthermore, using the apparatus of this invention the weight of oxygen in the air introduced into the carburetor is maintained relatively constant over a wide range of temperatures and barometric pressures. An important advantage of the apparatus of this invention 10 is that it does not require the use of horsepower from the engine but the required energy is derived from the forward force of the car as it is accelerated.

The results obtained for a given engine configuration will very widely depending on the cubic inches displacement of the engine and how the engine has been modified. However, as an example of the effectiveness of the apparatus of this invention and method of this invention, the following test was conducted.

A stock car having a 383 cubic inch Chrysler engine modified to a 12.5 to 1 compression ratio and equipped with a 4:88-1 rear was raced in a quarter mile to determine the performance of the engine with and without the apparatus of this invention 10. The engine timing was held constant. An air scoop 12 having a container 24 was installed on the hood 14 with the aperture to the carburetor being placed as shown in FIG. 2. Dry ice was not placed in the container 24. The car was tested on repeated trial runs and adjusted to obtain the optimum performance from the engine. It was found that when 0.84 inches main metering jets were used in the carburetor the maximum obtainable speed was achieved. The fact that the fuel and air mixture was optimized was determined by removing the spark plugs and adjusting the air-fuel mixture and the carburetor until the above-mentioned light tan color and a dry plug was obtained. The ambient air temperature for the test run was 92° F while the temperature on the asphalt track was 100° F. The car equipped and adjusted as noted above was tested in a series of one quarter mile test runs from a standing start. The time from the standing start to the one quarter mile post was 11.880 seconds, which is 108 miles per hour.

The loading port 30 in the air scoop 12 was open and the container completely filled with dry ice. The loading port 30 was reinstalled and locked in place. The car was allowed to sit for approximately 10 minutes until the exposed surface 32 of the chamber 26 came to an equilibrium temperature.

A series of test runs were again commenced to ascertain the proper air-fuel mixture and also to determine the performance characteristics. The main metering jets were readily increased from the afore-mentioned maximum of 0.84 inches to a metering jet of 0.128 inches. The tests of the plugs at the end of the trial runs indicated that even a larger main metering jet could be utilized and thereby further increase horsepower.

For the subsequent trial runs under the same temperature and barometric conditions as in the previous trial it was found that the car having the air cooled by the apparatus of this invention 10 ran the quarter mile in 10.002 seconds for a speed of 113 miles per hour.

This improvement is considered quite remarkable in that it was a reduction of almost two seconds for the time of the quarter mile.

It was further found that the engine equipped with the apparatus of this invention and operated in accordance with the method of this invention was not highly subjective to variations in atmospheric pressure and temperature. Changes in temperature and barometric pressure which normally would have required a major adjustment of the air-fuel mixture did not substantially affect the performance of the modified engine having the air cooling means of this invention.

Figure 4:
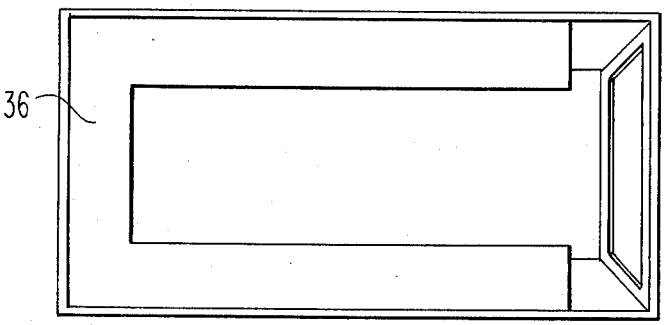
FIG. 4 is a bottom view of an alternate embodiment of the apparatus of this invention having a U-shaped cooling means.

The above invention was described utilizing a chamber 26 positioned in the central portion of the air scoop 12. It is possible, however, to use other shaped chambers such as the U-shaped chamber 36 shown in FIG. 4 or to use several chambers such as an upper and lower chamber so that the air flows through a channel to achieve the cooling. In addition, it will be appreciated by those skilled in the art that the apparatus of the invention while illustrated with a single carburetor can likewise be used with an engine having multiple carburetors.

It shall also be appreciated that while the apparatus 10 described above is specially adapted to cars which are run in the substantially stock configuration, the apparatus and method of this invention can be used on other types of race vehicles, such as Indy type cars, boats, motorcycles, and even vehicles having low displacement engines such as go-carts.

The apparatus of this invention can be likewise used on large displacement engines such as those used on commercial vehicles such as trucks to achieve additional horsepower for special conditions, for instance heavy loads, hills, or in rarefied air found at high altitudes.

Figure 5:
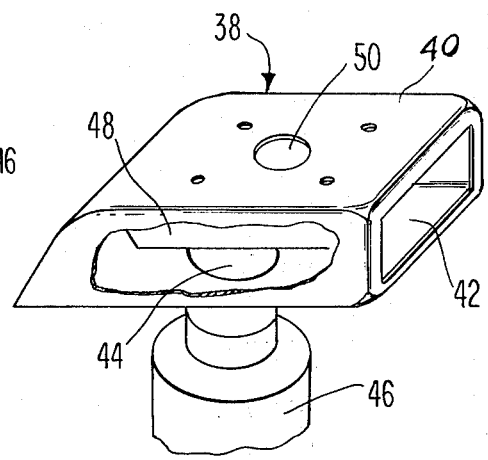
FIG. 5 is a further alternate embodiment of the apparatus of this invention especially adapted for use on engines which do not have hoods adjacent to the carburetor to form the base of the apparatus of this invention, such as automobiles without hoods, boats, and motorcycles.

The apparatus of this invention can likewise be used on vehicles which do not have hood portion 14 to form the base such as vehicles having exposed engines by using the embodiment 38 shown in FIG. 5 with the side partially broken away for purpose of illustration. The unit 38 includes the housing 40 which forms the entire air scoop including the base portion. The housing 40 is made with an inlet aperture 42, and an outlet aperture 44 and is illustrated on a carburetor 46. A cooling chamber 48 is mounted in the housing similar to the apparatus shown in FIG. 1. A loading port 50 and vent hole are likewise provided. The unit 38 is operated substantially the same as that described above.

At this point it should be carefully noted that it is the principle of super cooling the ambient air prior to merging it with the fuel which forms the essence of this invention. As pointed out above dry ice is highly preferable for this purpose as it is universally available. The cooling capacity of the dry ice can, of course, be increased by using the various types of additives such as acetone and other organics which increase the decomposition rate and thereby increase the cooling capacity of the dry ice. While dry ice has been given as the preferable embodiment, the requirement is that the air be sufficiently cooled to make substantial increases in the oxygen content of the air. This can be done utilizing other cooling media such as super-cooled ice and also canisters of gases which cool on release, such as freon and the like.

I claim:

1. An apparatus for use with an internal combustion engine which utilizes a carburetor and which burns a mixture of (a) a fuel which is liquid at ambient temperature and pressure and (b) air; said apparatus comprising in combination an air scoop means having wall means forming a first enclosed chamber; said air scoop means having an air inlet aperture and an air outlet aperture; said air inlet aperture being in communication with an ambient air source and the interior of said first chamber; said air outlet aperture being in communication with the interior of said first chamber and being adapted to communicate with an air inlet means of said carburetor; whereby when air is introduced through said air inlet aperture, the air flows through said first chamber to said air outlet aperture to provide an air flow path through said first chamber; said apparatus further including a second chamber of a generally pan-shaped configuration secured in a sealing engagement to the upper interior surface of said air scoop means and being made of a highly temperature conductive material said second chamber being of a volume less than the volume of said first chamber; said second chamber protruding into the air flow path through said first chamber; said second chamber further having access means for introduction of a coolant medium into said second chamber; whereby when said apparatus is in communication with the carburetor of an internal combustion engine and a coolant medium is introduced into said second chamber the air flowing from the first inlet to the second inlet is cooled by said coolant prior to entering the carburetor, increasing the quantitative amount of oxygen in a given volume of air supplied to said carburetor; whereby increased horsepower can be obtained by providing additional fuel to said engine.

2. The apparatus according to claim 1 wherein the first chamber has vent means rearward of the second chamber and in communication with the air flow within said first chamber and the atmosphere, said vent means being of a size sufficient to remove amount of water vapor containing air from said first chamber to prevent substantial ice formation within said apparatus when said coolant is in said second chamber.

3. The apparatus according to claim 1 wherein said second chamber further includes fin means in heat transfer engagement within the second chamber which extends into the air flow passage.

4. In the method for increasing the effective horsepower of an internal combustion engine which burns a mixture of (a) a fuel which is liquid at ambient temperature and pressure and (b) air; the improvement which comprises: cooling said air from ambient temperature to a temperature substantially lower than said ambient temperature by indirect contact with dry ice to provide cooled air; increasing the weight of fuel per given volume of cooled air in the mixture from that required for use with ambient temperature air to an amount required with said cooled air to obtain operational efficiency and burning the mixture of cooled air and fuel in said engine whereby increased horsepower is obtained.

5. The method according to claim 4 wherein the air is cooled to approximately minus 80° F.

* * * * *